(12) United States Patent
Lee et al.

(10) Patent No.: US 8,798,168 B2
(45) Date of Patent: Aug. 5, 2014

(54) VIDEO TELECOMMUNICATION SYSTEM FOR SYNTHESIZING A SEPARATED OBJECT WITH A NEW BACKGROUND PICTURE

(75) Inventors: Jin Soo Lee, Seoul (KR); Ji Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1889 days.

(21) Appl. No.: 11/520,587

(22) Filed: Sep. 14, 2006

(65) Prior Publication Data

US 2007/0009028 A1 Jan. 11, 2007

Related U.S. Application Data

(62) Division of application No. 10/252,409, filed on Sep. 24, 2002, now abandoned.

(30) Foreign Application Priority Data

Sep. 26, 2001 (KR) .................................. 2001-59567

(51) Int. Cl.
*H04N 7/12* (2006.01)

(52) U.S. Cl.
USPC ...................... 375/240.26; 345/594

(58) Field of Classification Search
CPC .................................................... H04N 5/272
USPC ........... 375/240.01, 240.08, 240.26; 345/594; 709/231
IPC ....................................................... H04N 7/12
See application file for complete search history.

(56) References Cited

U.S. PATENT DOCUMENTS

| 5,469,536 | A | 11/1995 | Blank | 345/594 |
| 6,483,851 | B1 * | 11/2002 | Neogi | 709/231 |
| 6,698,943 | B2 | 3/2004 | Gluck | 348/157 |

FOREIGN PATENT DOCUMENTS

| EP | 0877274 | 11/1998 |
| EP | 1 115 254 A2 | 7/2001 |
| EP | 1115254 | 7/2001 |
| KR | 2001038032 | 5/2001 |
| KR | 2001038032 A | 5/2001 |
| KR | 2001-67992 | 7/2001 |
| RO | 97-01656 | 8/1997 |

OTHER PUBLICATIONS

Kauff et al. "Functional Coding of Video Using a Shape-Adaptive DCT Algorithm and An Object-Based Motion Prediction Toolbox" IEEE, vol. 7, No. 1, Feb. 1997, pp. 181-195, XP000678890 ISSN: 1051-8215.

(Continued)

*Primary Examiner* — Young Lee
(74) *Attorney, Agent, or Firm* — KED & Associates LLP

(57) ABSTRACT

Embodiments of a video telecommunication system are provided that can obtain a background scene desired by a user by automatically changing a background scene into a different background scene. The system can include a background picture synthesis unit and a background scene separation unit that can separate an object to be transmitted and a background scene except for the object in a picture in a process of transmitting/receiving data including at least the picture. A background picture database can provide a background picture to be transmitted instead of the background scene. The background picture synthesis unit can synthesize the separated object and a new background picture (e.g., selected from the background picture database). A picture transmission unit can transmit a synthesized picture synthesized by the separated object and the new background picture.

8 Claims, 18 Drawing Sheets

(56) References Cited

OTHER PUBLICATIONS

MPEG-4 Overview (V.18-Singapore Version), ISO/TEC JTC1/SC29/WG11 N4030, XP000984360, Mar. 2001, pp. 1-69.

XP-000678890, Kauff, P. et al., Functional Coding of Video Using a Shape-Adaptive DCT Algorithm and an Object-Based Motion Prediction Toolbox, Feb. 1997, p. 181-195.

XP-000984360, Rob Koenen, "MPEG-4 Overview", Mar. 2001, p. 1-69.

XP002349341,Romanian State Office for Inventions and Trademarks, "Process for Replacing the Background in Shots", Aug. 29, 1997.

XP002386931, Dockstader, Shiloh L. et al., "Real-time Object Tracking and Human Face Detection in Cluttered Scenes", vol. 3974, 2000, pp. 957-968.

XP002387028, Ling Guam; S.Y. Kung, Jan Larsen, "Multimedia Image and Video Processing", Aug. 23, 2000, pp. 113-130.

XP000873442, Salembier, P. et al., "Region-Based Representations of Image and Video: Segmentation Tools for Multimedia Services", vol. 9, No. 8, Dec. 1999, pp. 1147-1169.

XP002386932, I. Pitas, C. Kotropoulos, A. Nikolaidis, C. Tsekeridou, "Algorithm for Face Localisation Facial Feature Extraction and Tracking", Oct. 1, 1997, pp. 1-14.

European Search Report dated Sep. 5, 2006.

\* cited by examiner

VIDEO TELECOMMUNICATION SYSTEM FOR SYNTHESIZING A SEPARATED OBJECT WITH A NEW BACKGROUND PICTURE

This application is a Divisional Application of Ser. No. 10/252,409 filed Sep. 24, 2002 now abandoned, which claims priority to Application Serial No 59567/2001 filed in Korea on Sep. 26, 2002, the entirety of which is incorporated herein by reference.

BACKGROUND OF THE INVENTION

1. Field of the Invention

The present invention relates to a video communication system based on a background and object separation, which is capable of separating a background from an object and dynamically synthesizing the separated background and object so that they can be used for a video telecommunication in accordance with a request by a user or communication environments.

2. Description of the Prior Art

The development of telecommunication and moving picture compression technologies enables video telecommunications under multimedia environments by which not only voice but also picture of communicating persons can be transmitted and received. The development of video telecommunication enables video telecommunications using PC cameras, video phones/picture telephones, mobile communication terminals, etc.

Under such video telecommunication environments, there may occur a case that a user is reluctant to disclose his present location to the other party, according to circumstances, for example, for the purpose of securing his privacy. In such a case, it should be allowed to perform only voice telecommunication with no video telecommunication or change a background scene into a different scene to be communicated.

However, it is very difficult, in speed and accuracy aspects, to automatically change the background scene under real-time environments during the video telecommunication. Accordingly, conventionally, a technology for sending the other party any still picture as a particular image specified by a user at a communication initial stage and then performing only voice communication has been introduced to some picture telephones.

However, since this technology is to send the other party any still picture replacing a video-telecommunicating person who never appears on a screen, the other party can hear only voice of the person. This means a loss of an essential function of the video telecommunication that a telecommunication is performed in a mutual viewing. In addition, the other party communicating while he sees the still picture without seeing an actual face may feel any displeasure.

Therefore, during the video telecommunication, there is a need of technology, which is capable of separating in real time a communicating person and a background scene and transforming or changing the background scene in a different scene. Like this, when the communication person makes his appearance but the background scene is changed into a different scene during the video telecommunication, the above-mentioned problems occurring when the actual face is conventionally replaced by the still picture cannot be solved.

However, a technology for automatically separating an interest region from a communicating picture in real time is prerequisite to an automatic change of the background scene into a different scene. Hereinafter, a conventional art for separating an object, particularly, the human region and the background scene will be described.

Of moving picture standards as technologies related to the separation of the object and the background scene, a MPEG-4 allows object-based picture compression coding. However, since the MPEG-4 itself is a technology for coding objects separated in advance, an object separation technology is prerequisite to the object-based picture compression coding. However, it is difficult for current technologies to accomplish an object separation which is fast enough to separate a required object and a background except for the object and then code the object and the background in a compression mode under the environments (video telecommunication/video conversation) requiring to compress and transmit video signals in real time.

Therefore, video telecommunication systems adopting the MPEG-4 as a standard cannot accomplish a coding of the unit of object, but compress and transmit the object in the form of general picture compression. This is referred to as MPEG-4 simple level.

On the other hand, technologies for separating the object and the background scene under no real time environment have also been suggested. For example, there is a technique for separating a partial region from an image based on color groups. Although this technique can separate the partial region from the image comparatively well, since the separated region is only a color-based region not a meaningful object region and a separation speed is very slow, it is difficult to apply to technologies requiring the separation of the object and the background scene under the real time environment such as the video telecommunication.

On the other hand, techniques for separating a face from an image have been proposed in consideration that the image in the video telecommunication has a characteristic that an object is a man. For example, there are a technology for extracting a face region by use of a face template formed by a transformation of information into wavelet frequency domain. This technology is a method for scanning and matching all of regions of the image while adjusting their templates from minimal size to maximal size.

However, this method requires very long processing time since the number of template matching is very large.

In addition, as a face region separation technology, there is a technology for extracting the face region by use of a characteristic that the face region has a range of human's skin color. Generally, the human's skin color exists within a specific range in a color space. Therefore, this technology is a method for extracting the face region by use of only pixels satisfying such a human's skin color condition.

However, generally, since the range of human's skin color is too wide, regions other than the face region in a picture have a possibility to be extracted as the face region, which makes a precise separation of the face region difficult.

While most of the above-described technologies for extracting the face region from the still picture do not use characteristics of the moving picture, a technology for extracting the face region by tracking the face region in the moving picture has been proposed.

More particularly, this technology is to track the face region, which has once extracted by means of motion information, through fewer processes.

However, since this technology is to track only a rough position at which the face is placed, it is difficult to precisely separate the face region and the background scene. Namely, although this technology can track an object (human's face) in the moving picture, there is a limit to a precise separation of the object and the background scene.

SUMMARY OF THE INVENTION

Accordingly, the present invention has been made keeping in mind the above problems occurring in the prior art, and an object of the present invention is to provide a video telecommunication system, which is capable of automatically separating an object and a background scene and changing the separated background scene into a different scene in a video telecommunication.

Another object of the present invention is to provide a video telecommunication system, which is capable of realizing a more effective background scene separation by constructing a face region extraction means and a general region extraction means separately and combining them in a video telecommunication system enabling a video telecommunication in which a background scene is automatically changed into a different scene.

Still another object of the present invention is to provide a video telecommunication system, which is capable of performing a background scene separation and synthesis at terminals by constructing a background scene separation means for separating a background scene and a background scene synthesis means for synthesizing a different background scene and placing the background scene separation means and the background synthesis means at a terminal for performing a video telecommunication in the video telecommunication system enabling the video telecommunication in which a background scene is automatically changed into a different scene.

Still another object of the present invention is to provide a video telecommunication system, which is capable of realizing a more effective background scene separation and synthesis by constructing a background scene separation means for separating a background scene and a background scene synthesis means for synthesizing a different background scene and placing the background scene separation means at a video telecommunication terminal and the background scene synthesis means at a server for providing services in the video telecommunication system enabling the video telecommunication in which a background scene is automatically changed into a different scene.

Still another object of the present invention is to provide a video telecommunication system, which is capable of synthesizing a background scene provided by a server into any background scene aiming at an advertisement and so on.

Still another object of the present invention is to provide a video telecommunication system for separating an object and a background scene and synthesizing the separated background scene into a different background scene replacing the separated background scene, which can be applied to a communication system including pictures, for example, video mail, as well as a video telecommunication including voice.

Still another object of the present invention is to provide a video telecommunication system for separating an object and a background scene and synthesizing the separated background scene into a different background scene replacing the separated background scene, which is capable of transmitting a video mail after changing and editing the background scene easily whenever a user wishes to transmit a different background scene by separating the object (face region), recording the information on a boundary between the separated object and the background scene, and synthesizing only the background scene without performing a repeated separation of the background scene later by means of the boundary information, when the video telecommunication system is applied to a communication system including pictures, for example, video mail, as well as a video telecommunication including voice.

In order to accomplish the above objects, according to an aspect of the present invention, there is provided a video telecommunication system comprising a background scene separation means for separating an object to be transmitted and a background scene except for the object in a picture in a process of transmitting/receiving data including at least a picture; a background picture database for providing a background picture to be transmitted instead of the background scene; a background picture synthesis means for synthesizing the separated object and a new background picture which is selected from said background picture database; and a picture transmission means for transmitting a synthesized picture synthesized by the separated object and the new background picture.

According to another aspect of the present invention, there is provided a video telecommunication system comprising a background scene separation means for separating an object to be transmitted and a background scene except for the object in a picture in a process of transmitting/receiving data including at least a picture; a boundary region description means for describing a boundary region between the separated object and background scene; a background picture database for providing a background picture to be transmitted instead of the separated background scene; a background picture synthesis means for synthesizing the separated object and a new background picture from said background picture database by use of the information on the boundary region description; and a picture transmission means for transmitting a synthesized picture synthesized by the separated object and the new background picture.

According to still another aspect of the present invention, there is provided a video telecommunication control method comprising the steps of: separating an object and a background scene in a picture to be transmitted; selecting a background scene to be transmitted instead of the separated background scene; synthesizing the separated object and the selected new background; and transmitting a synthesized picture synthesized by the separated object and the new background picture.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
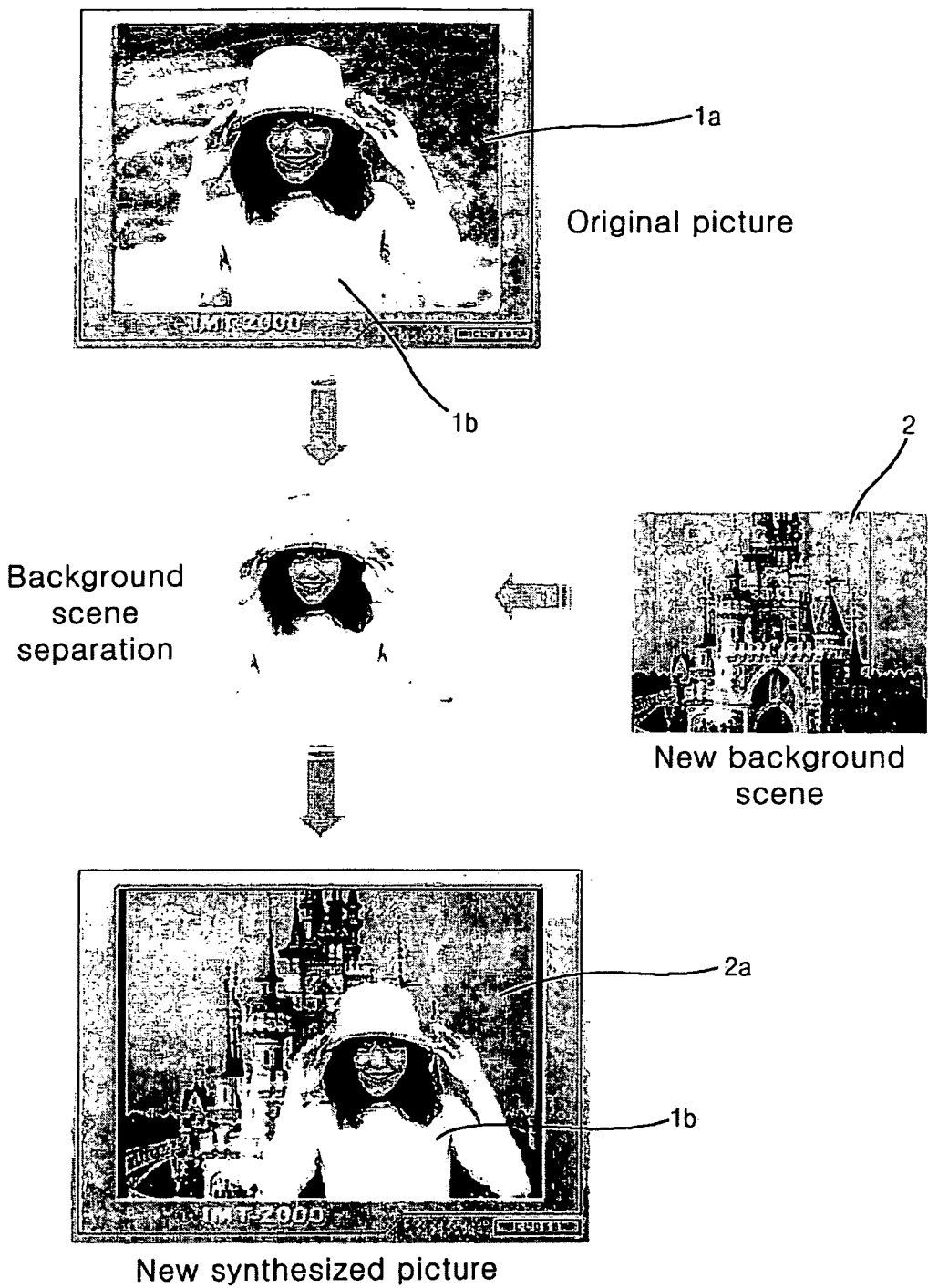
FIG. 1 is a view for explaining a concept of picture separation and synthesis for a video telecommunication in a video telecommunication system according to the present invention.

Reference now should be made to the drawings, in which the same reference numerals are used throughout the different drawings to designate the same or similar components.

Hereinafter, the present invention will be in detail described through various embodiments.

A technology for automatically changing a background scene in a video telecommunication system of the present invention can have two applications; one being a case of a real time video telecommunication including voice with other party and another being a case of transmission of not only a picture but also other information such as a text.

As an example of the former, there is a video telecommunication field in which a background scene is changed into an advertisement background scene or a different background scene desired by a user at the time of video telecommunication. As an example of the latter, there is a video mail field in which a video mail is transmitted after a background scene is changed into a different background scene desired by a user and a video mail edition including an addition of messages and so on is performed. Both cases will be considered as a video telecommunication system of the present invention.

FIG. 1 is a view for explaining a concept of a background scene change in a video telecommunication.

Referring to FIG. 1, after only an interest region 1b is separated from an original picture including a background scene 1a and the interest region 1b, the separated interest region is synthesized with a new background scene 2 and the synthesized picture having the interest region 1b and the new background scene 2a is transmitted.

Figure 2:
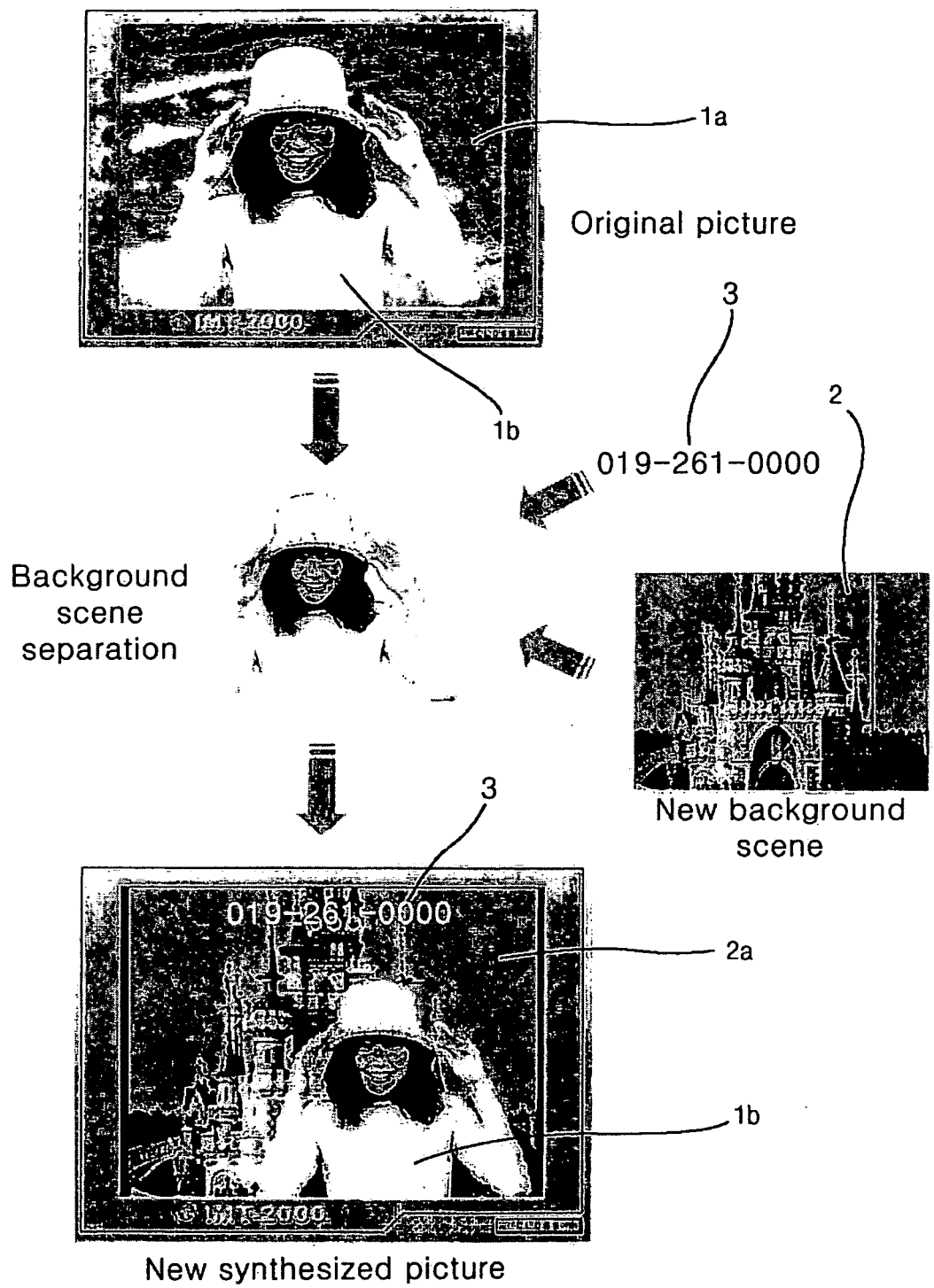
FIG. 2 is a view for explaining a concept of picture separation and synthesis for a video mail in a video telecommunication system according to the present invention.

FIG. 2 is a view for explaining a concept of a background scene change in a video mail.

Referring to FIG. 2, after only an interest region 1b is separated from an original picture including a background scene 1a and the interest region 1b, the separated interest region is synthesized with a new background scene 2, characters 3 are inserted, and the synthesized picture having the interest region 1b, the new background scene 2a and the characters 3 is transmitted.

Here, the characters 3 can be inserted with a designation of a character display method including insertion position, font and size of characters, fixed characters or moving characters, etc.

On the other hand, in case of the video mail, a process required to change a background scene does need not be performed in real time. However, in case of the video communication, since a background scene should be separated and synthesized in real time in order to make the above-mentioned service possible, it is required to provide an effective background scene separation and synthesis method.

From now on, first, the video telecommunication system enabling a telecommunication service for a real time separation and change of the background and the object will be described in detail, and subsequently, the video mail and other application services based on the separation and synthesis of the background scene and the object will be described in detail.

The video telecommunication system of the present invention can be implemented as various embodiments depending on positions of a means for separating the background and the object from the picture and a means for synthesizing the separated object and a new background scene.

Figure 3:
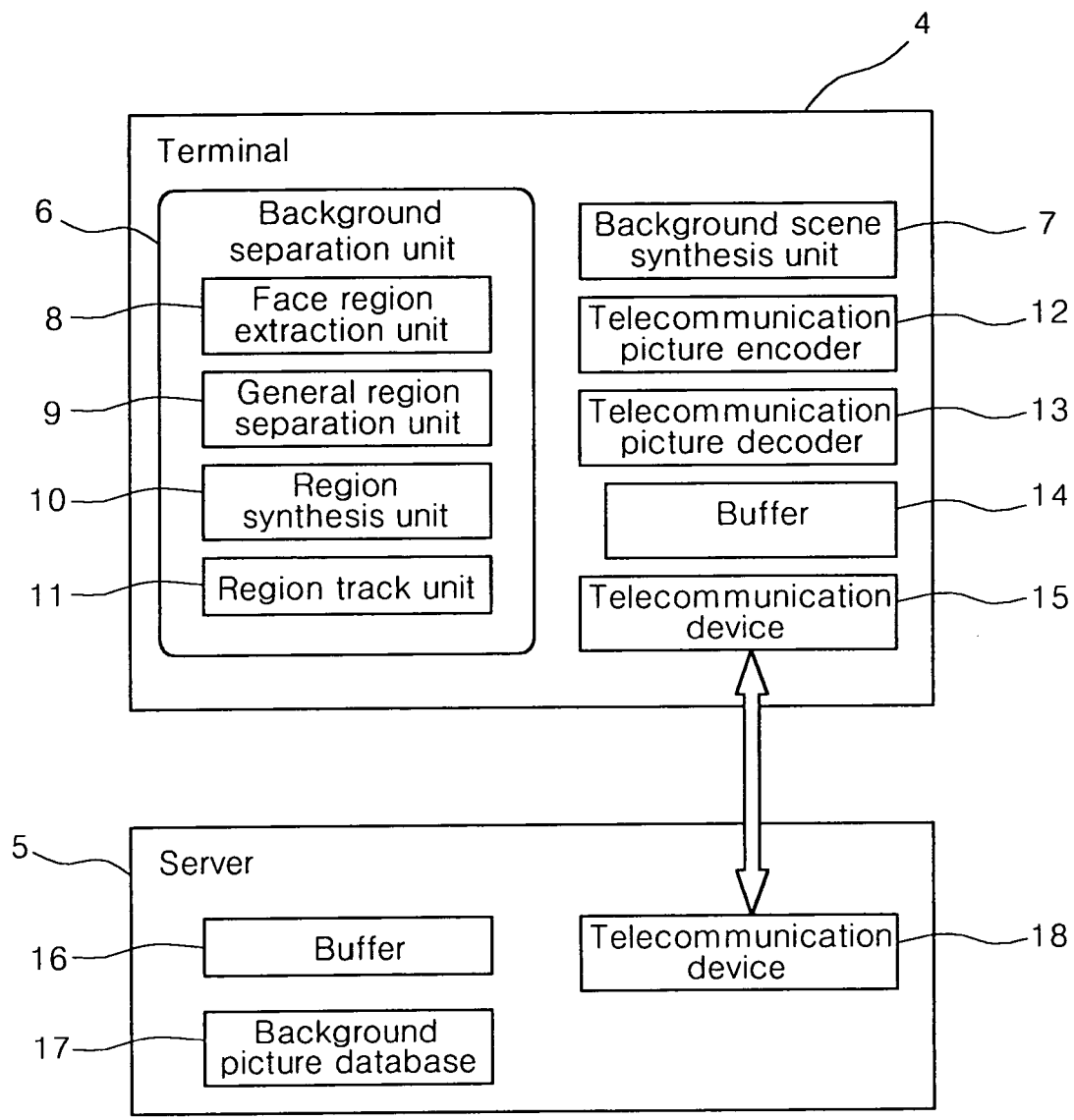
FIG. 3 is a view for showing a system configuration in which a background scene separation means and a background scene synthesis means are located at a terminal in a video telecommunication system according to the present invention.

FIG. 3 is a view for showing a configuration of an embodiment in which a background scene separation means and a background scene synthesis means are located at a terminal in a video telecommunication system according to the present invention.

Referring to FIG. 3, the video telecommunication consists generally of a terminal 4 for performing a video telecommunication and a server 5 for providing services.

The terminal 4 includes a background separation unit 6 for separating a background scene and an object from each other in a picture and a background scene synthesis unit 7 for synthesizing the separated object and a new background scene. The background separation unit 6 includes a face region extraction unit 8 for extracting a face region from the picture, a general region separation unit 9 for separating a general region except for the face region, a region synthesis unit 10 for synthesizing regions, which are determined as a human region by use of the extracted face region, and a region track unit 11 for tracking a concerned region in next successive frames by use of information on the extracted face region.

In addition, the terminal 4 further includes a picture encoder 12 for encoding transmission picture signals for telecommunication, a picture decoder 13 for decoding reception picture signals for telecommunication, a buffer 14 for processing telecommunication signals, and a telecommunication device 15 for transmitting and receiving the picture signals according to communication protocol.

The server 5 includes a buffer 16 for processing picture signals to be used for telecommunication and background scene, a background scene database 17 for storing information on pictures to be provided for the background scene, and a telecommunication device 18 for transmitting and receiving the picture signals according to prescribed communication protocol in order to provide the picture information stored in the background scene database to the terminal.

In FIG. 3, the terminal 4 can be a PC on which a PC camera is mounted, a video phone, etc. The background scene database 17 for providing the background picture can be placed at either the server 5 or the terminal 4.

If the database 17 is placed at the server 5, when a background scene is changed into a different background scene desired by a user, the desired different background scene is received from the server 5. If the database 17 is placed at the terminal 4, background pictures in the terminal 4 are used.

In case of the video telecommunication system of FIG. 3, all background scene change is accomplished in the terminal 4 and pictures with changed background scenes are encoded and transmitted, which will be described in detail.

The face region extraction unit 8 extracts a face region from an original picture to be transmitted. A method for extracting the face region will be described in detail with reference to FIG. 8. The general region separation unit 9 identifies and separates regions having similar color and textures as single region by color/texture information, and separates the face region as a portion of the general region.

The region synthesis unit 10 synthesizes regions, which are determined as human regions with reference to position of the face region extracted in the face region extraction unit 8, of the separated regions. For example, since a neck, a body, an arm, and a leg are typically positioned below a face, when the face region is known, a region which is determined as a human can be extracted from the known face region. Motion information is additionally used for such a extraction.

When a region which is a beginning background scene and a region which is determined as a man are separated as described above, a human region can be extracted by a simpler method from next successive picture frames by using an assumption that the separated human region is continuously moved. The region track unit 11 takes responsibility for this task.

More particularly, without newly separating a background scene in next frame by use of the motion information, the background scene in next frame can be separated only by slightly changing and expanding the human region extracted previously. For example, when the motion information is toward a specific direction, an easier background scene separation can be accomplished by examining pixels having same color information as human region in the previous frame in the direction indicated by the motion information and moving or expanding the region. This method also reflects that the size of the human region depends on a distance between a camera and a human to be photographed. As described above, the background scene separation unit 6 can separate the background scene and the object (human).

The background scene synthesis unit 7 synthesizes regions other than the human region, that is, a background scene desired by a user or designated by a server. More particularly, the server 5 sends the user background pictures stored in the background scene database 17 and selected by the user or designated by the server through the buffer 16 and the telecommunication device 18, and the user can obtain a synthesized picture having a different background scene by selecting a desired one of the background pictures or synthesizing the background picture designated by the server. On the other hand, if the database 17 related to the background scene is stored in advance in the terminal 4, the user can conveniently and directly select the background picture without a sending process of the background picture.

The picture synthesized with the background scene is encoded into a prescribed format by the picture encoder 12, transmitted to a terminal of the other party through the buffer 14 and the telecommunication device 15. When the terminal 4 receives a picture from the other party, the received picture is decoded by the decoder 13 and displayed on a screen, so that a video telecommunication is accomplished.

Figure 4:
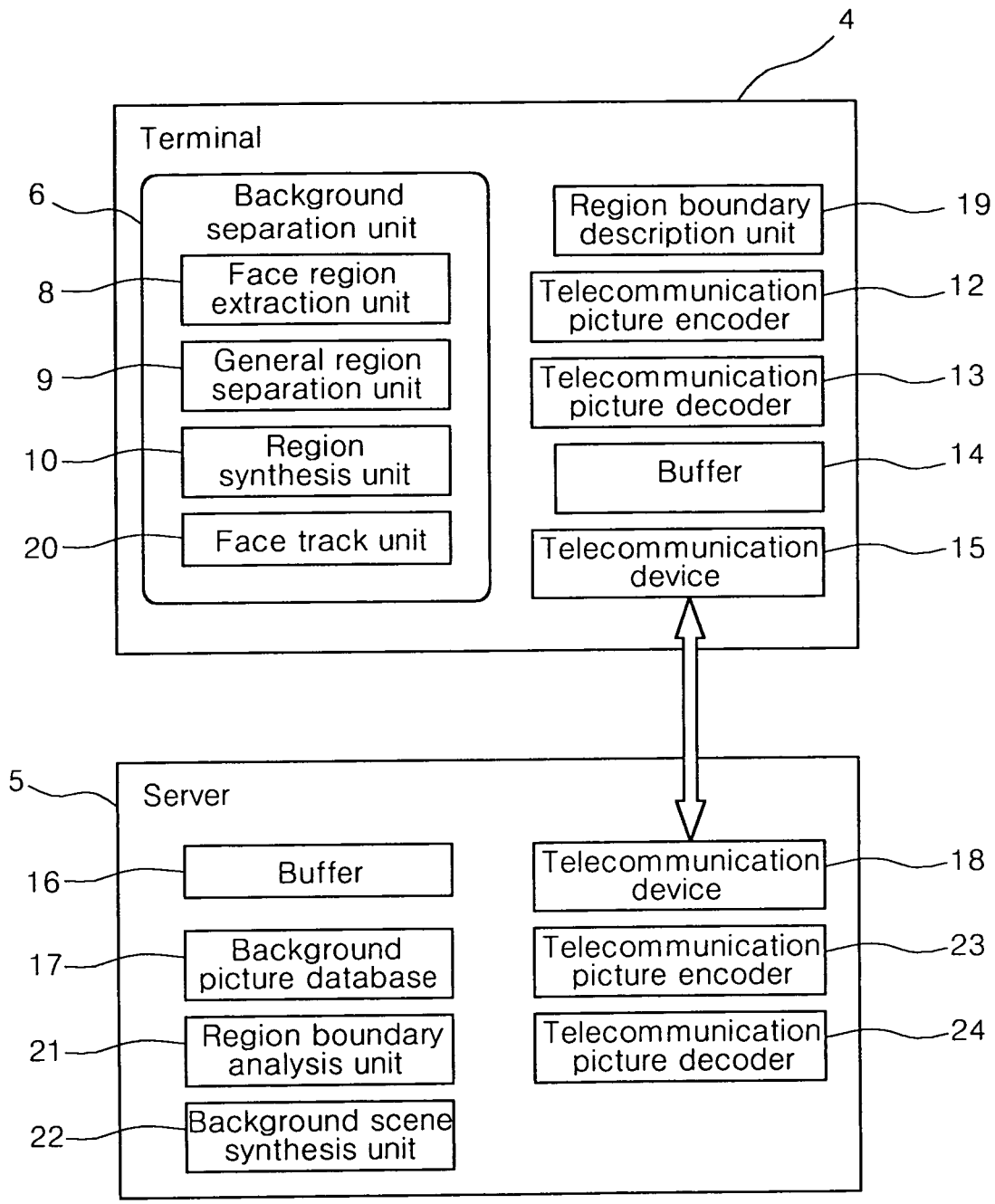
FIG. 4 is a view for showing a system configuration in which a background scene separation is achieved in a terminal and a background scene synthesis is achieved at a server in a video telecommunication system according to the present invention.

FIG. 4 is a view for showing a system configuration in which a background scene separation is achieved in a terminal and a background scene synthesis is achieved at a server in a video telecommunication system according to the present invention.

Referring to FIG. 4, the background scene separation unit 6 is placed at the terminal 4 and the background scene synthesis unit 22 is placed at the server 5. The background separation unit 6 includes the face region extraction unit 8, the general region separation unit 9, the region synthesis unit 10 and a face track unit 20. The face track unit 20 performs same function as the region track unit of FIG. 3.

In addition, the terminal 4 includes a region boundary description unit 19 for describing information on a boundary between the separated background scene and the human region, the picture encoder 12, the picture decoder 13, the buffer 14, and the telecommunication device 15.

The server 5 includes the buffer 16, the background scene database 17, the telecommunication device 18, a region boundary analysis unit 21 for analyzing the information on the boundary between the separated background scene and the human region provided from the region boundary description unit 19, a background scene synthesis unit 22 for synthesizing a background scene by using boundary analysis information, and a picture encoder 23 and a picture decoder 24 for transmitting and receiving a picture synthesized with a new background scene.

In the video telecommunication system of FIG. 4, the terminal 4 performs only the background scene separation and transmits the separated background scene, with only the boundary region of the separated background scene described by the region boundary description unit 19. The server 5 receives the separated background scene, synthesizes the background picture stored in the database 17, and then resends the synthesized background picture to the terminal 4. Such operations will be described in more detail below.

As described above with reference to FIG. 3, the background scene separation unit 6 separates the background scene region and the human region. At that time, only the information on the boundary region between the separated human region and the background scene region is described by the region boundary description unit 19, and the region boundary information together the picture information on the human region is transmitted to the server 5 by use of the picture encoder 12, the buffer 14 and the telecommunication device 15.

In the server 5, the region boundary information and the picture info nation on the human region are received through the telecommunication device 18 and the picture decoder 24, the region boundary analysis unit 21 recognizes the boundary between the human region and the background scene by analyzing the received region boundary information, and the background scene synthesis unit 22 selects the background picture, which is stored in the database, designated by the user or the background picture designated optionally by the server and then synthesizes the selected background picture with the picture information on the human region. The picture signals synthesized with such a new background scene (or picture) are encoded by the picture encoder 23 and are transmitted again through the telecommunication device 18.

As examples of a method for expressing the boundary between the regions separated in FIG. 4, the following two methods can be proposed.

A first method is that when pixels of the background region except for the human region are transmitted to the server after filled with pixel values, such as 'NULL', distinguished from meaningful pixel values, the server fills the remaining regions except regions having meaningful pixel values with pixels of a new background scene. This method allows a fast background scene synthesis since the background scene can be synthesized by only bit operators and also allows a detailed level of boundary expression since the boundary can be expressed by the unit of pixel.

A second method is that under an assumption that the separated regions can be expressed by a polygon, wherein the separated regions are expressed by a sequence of points corresponding to apexes of the polygon. Compared to the first method, the second method has a merit that the size of data expressing the boundary region becomes very small. However, since the second method expresses the boundary region as the polygon not the unit of pixel, it is difficult to express a detailed level of boundary. In addition, the second method requires a long synthesis time due to a difficulty of background scene synthesis by use of simple bit operators.

The video telecommunication system of FIG. 4 as described above is particularly useful for a case that an amount of information on a picture to be a background scene is enormous. In other words, while the video telecommunication system of FIG. 3 requires to take much time to transmit a concerned background picture in the server to the terminal for the background scene synthesis performed in the terminal, the video telecommunication system of FIG. 4 can be particularly effective for a case of an enormous amount of information on a picture to be a background scene since the server can synthesizes directly the background scene without transmitting it to the terminal.

Figure 5:
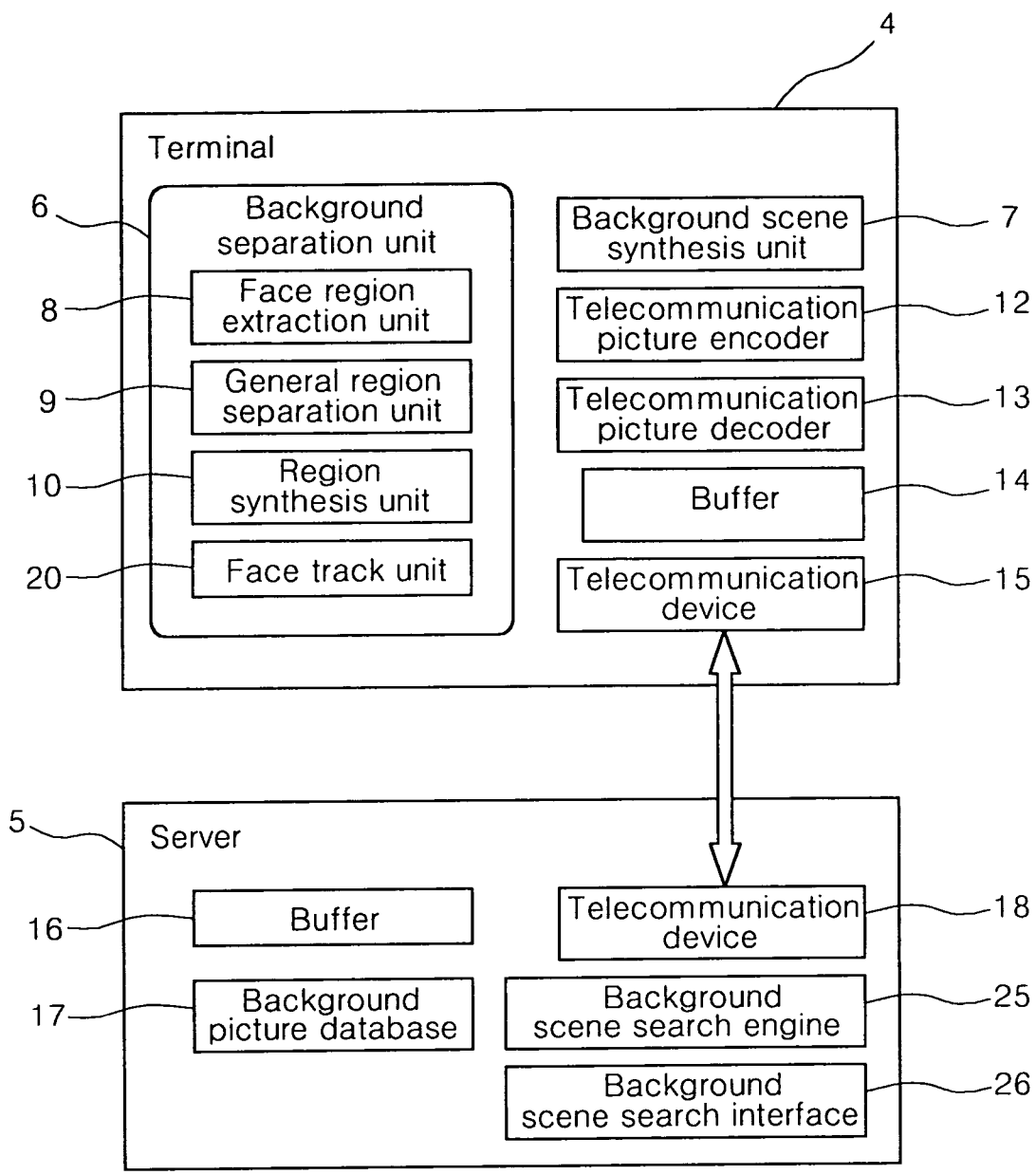
FIG. 5 is a view for showing a system configuration in which background scene separation and synthesis are achieved at a terminal and a background scene search engine is provided at a server in a video telecommunication system according to the present invention.

FIG. 5 is a view for showing a configuration of the video telecommunication system on which a content-based background picture search means is mounted.

Referring to FIG. 5, particularly, it is shown that the terminal includes the background scene separation unit and the background scene synthesis unit. In other words, the terminal 4 includes the background scene separation unit 6, the background scene synthesis unit 7, the picture encoder 12, the picture decoder 13, the buffer 14 and the telecommunication device 15, and the background scene separation unit 6 includes the face region extraction unit 8, the general region separation unit 9, the region synthesis unit 10 and the face track unit 20.

The server 5 includes the buffer 16, the background picture database 17, the telecommunication device 18, a background scene search engine 25, and a background scene search interface 26.

The background scene search engine 25 allows a user to search and use the background scene through a content-based search when the user is to communicate or send a video mail with a desired different background scene. In other words, the user can search a background scene in the background picture database 17 desired by him by use of the content-based background scene engine 25 through the background scene search interface 26.

This is useful for the following reason. That is, when a background scene to be edited is an image or a moving picture, the user can designate a background scene desired by him by searching similar images or moving pictures by use of color, texture distribution, etc.

Figure 6:
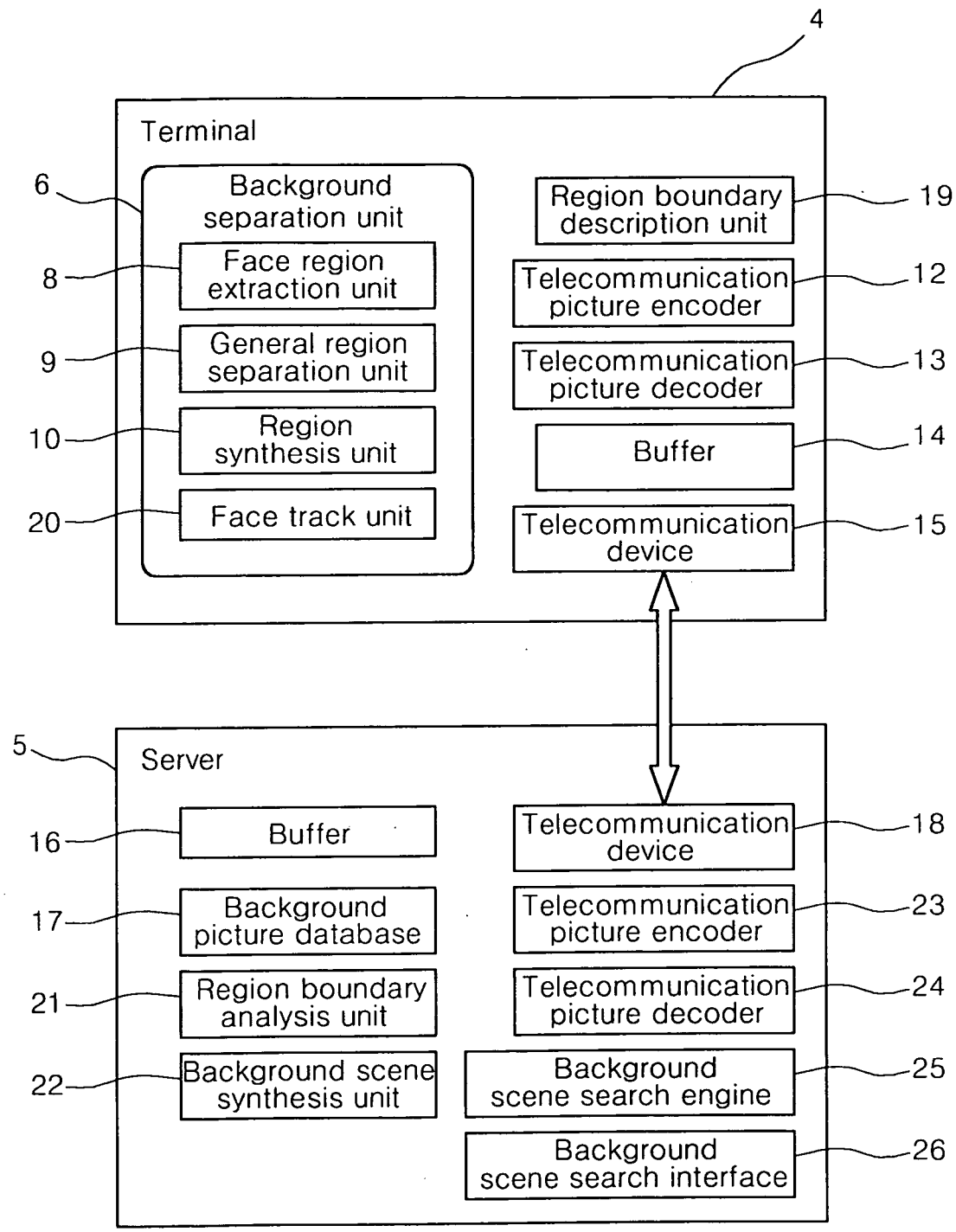
FIG. 6 is a view for showing a system configuration in which a background scene separation is achieved at a terminal and a background scene synthesis and a background scene search engine are provided at a server in a video telecommunication system according to the present invention.

FIG. 6 is a view for showing a configuration of the video telecommunication system on which the content-based background picture search means, that is, the background scene search engine 25 and the background scene search interface 26, is mounted. Particularly, it is shown that the terminal 4 includes the background scene separation unit 6 and the region boundary description unit 19 and the server 5 includes the background scene synthesis unit 22 and the boundary region analysis unit 21.

The operation of the video telecommunication system of FIG. 6 can be understood in same way as FIGS. 3 and 5.

Figure 7:
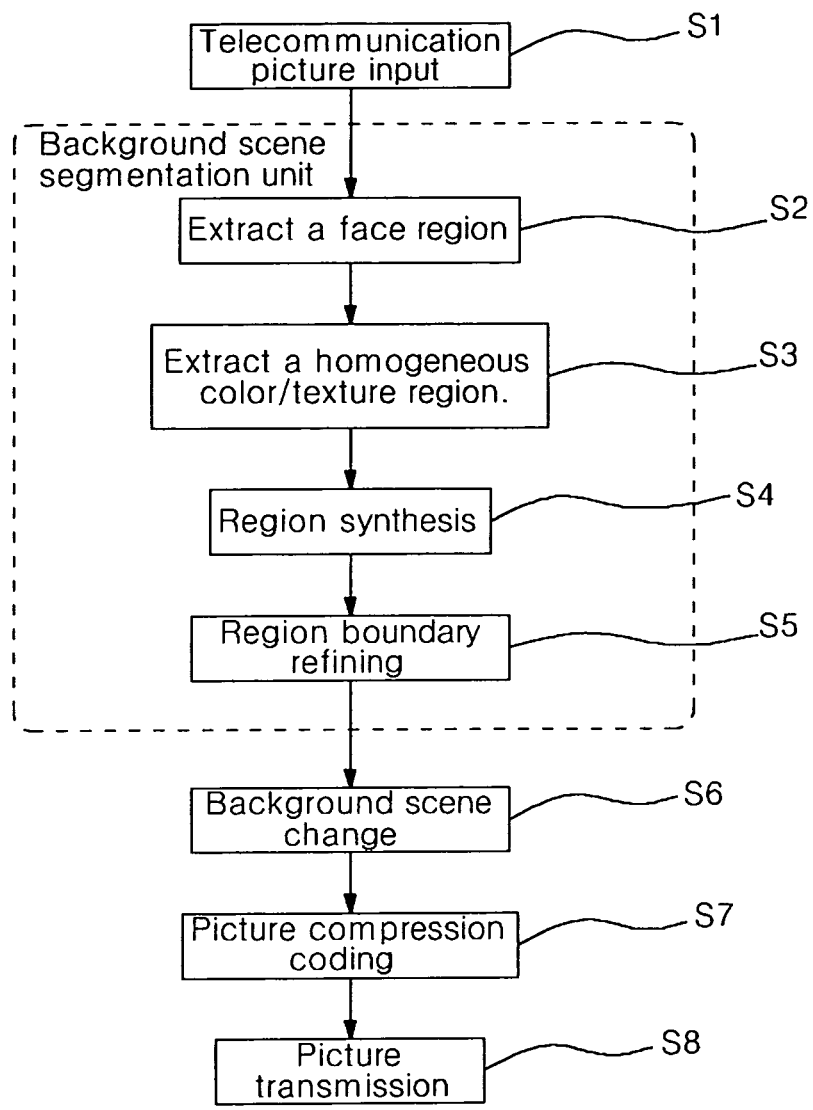
FIG. 7 is a flow chart for explaining an operation of a video telecommunication system according to the embodiment of FIG. 3.

FIG. 7 is a flow chart for explaining an automatic background scene change video telecommunication in the video telecommunication system of the present invention, which includes procedures of picture input, background scene segmentation, background scene change, picture compression and picture transmission.

In the picture input procedure S1, when a video telecommunication begins, a picture to be transmitted is inputted as a system input. In the background scene segmentation procedure S2-S5, the background scene segmentation of the inputted picture is carried out according to the following steps.

First, in the face region extraction step S2, a position of region to be determined as a face by use of color information and the like is extracted. Next, in the homogeneous color/texture region segmentation step S3, regions having similar colors and textures are segmented. Next, in the region merge step S4, regions to be determined as human regions are merged (i.e., synthesized) by use of information on regions having homogeneous motions and the position of face region. Next, in the region boundary refine step S5, the boundary portions in the merged region are smoothed in order to improve a picture quality.

In the background scene change procedure S6, the remaining regions except the segmented human region are changed into a new desired background scene. Next, in the picture compression procedure S7, compression coding (encoding) for transmitting the picture having the new changed background scene is performed. Finally, in the picture transmission procedure S8, the compressed picture signals are transmitted.

In a series of procedures as described above, the face region extraction step S2 and the homogeneous color/texture region segmentation step S3 may be reversed in order.

Figure 8:
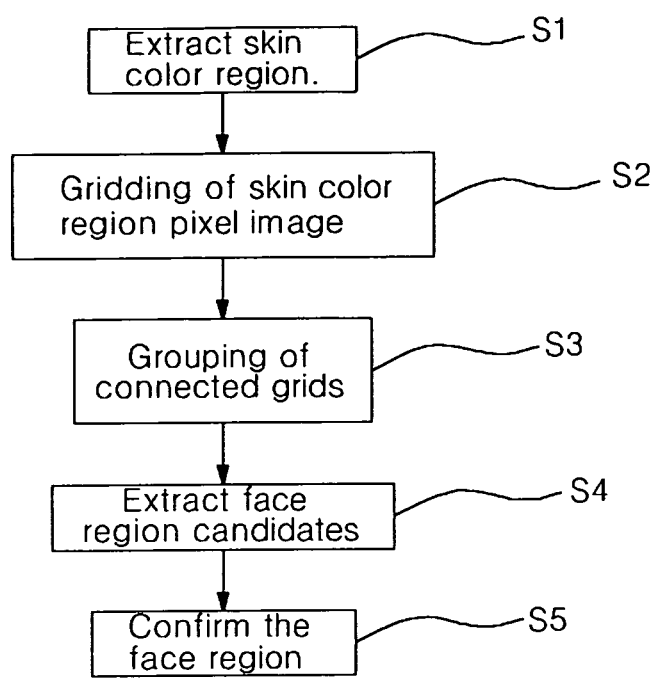
FIG. 8 is a view showing a face region extraction process applied to a video telecommunication system according to the present invention.

FIG. 8 is a view for explaining an embodied example of the face region extraction step S2 in FIG.

Figure 9:
FIG. 9 through FIG. 14 are views showing examples of images for explaining gridding and grid-grouping of skin region pixel image in a face region extraction process applied to a video telecommunication system according to the present invention.
Figure 10:

Referring to FIG. 8, the skin color regions are extracted before the face region is extracted (S1). Namely, after it is determined whether color of each pixel in the inputted picture corresponds to the skin color regions, only pixels corresponding to the skin color are indicated as face region candidate pixels. Assuming that color of a given pixel is expressed by three values in a YCrCb color space, if the three values Y, Cr, Cb satisfy prescribed values, it is determined that the given pixel is the skin color region. Examples expressing only skin color regions are shown in FIG. 9 and FIG. 10. FIG. 10 shows an image formed by the extraction of only skin color corresponding to the face from an original image of FIG. 9. Here, the reason that the color is expressed in the YCrCb color space is that color information obtained by decoding MPEG files is YCrCb.

Figure 11:

In FIG. 8, in next step, gridding of the skin region pixel image is performed (S2). After the image having only skin color pixels are segmented into M*M cells, only cells having a skin color pixel percentage above a prescribed threshold value, the skin color pixel percentage telling how much the skin color pixel occupy in one cell, i.e., (the number of skin color pixel in one cell)/(the total number of pixel in one cell), are set to "1", the remaining cells set to "0". An example of image formed by such gridding of FIG. 10 is shown in FIG. 11.

In FIG. 8, in next step, grouping of grids connected together is performed (S3). Namely, if grids set to "1" are adjacent to each other, the grids are determined to be in same region and are grouped.

Figure 12:
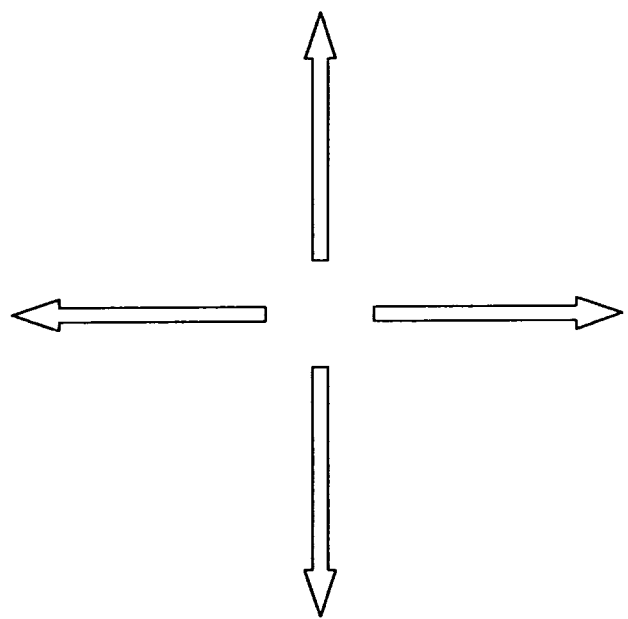
Figure 13:
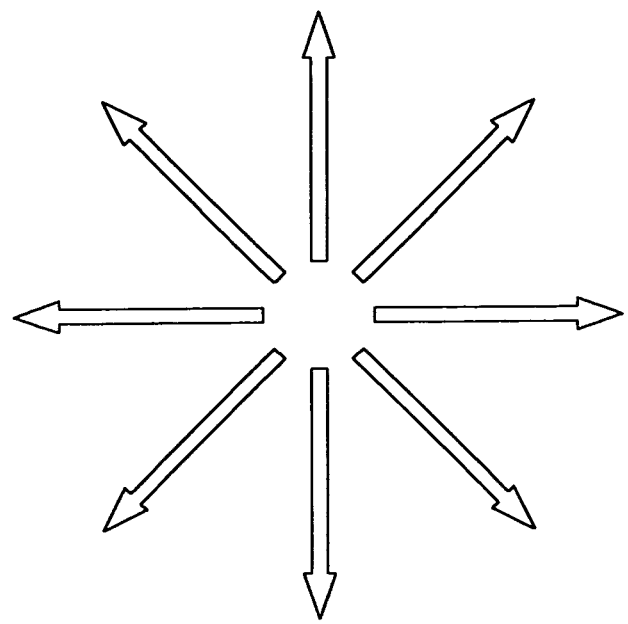

Here, a determination on whether the grids are adjacent to each other is made according to either 8 directional way or 4 directional way. The 4 directional way means that when the grids are adjacent in top, bottom, left and right directions as shown in FIG. 12, they are determined to be adjacent to each other. The 8 directional way is a case that a diagonal direction is further considered as shown in FIG. 13, in addition to the directions in FIG. 12. The 8 directional way is used for this embodiment.

Figure 14:
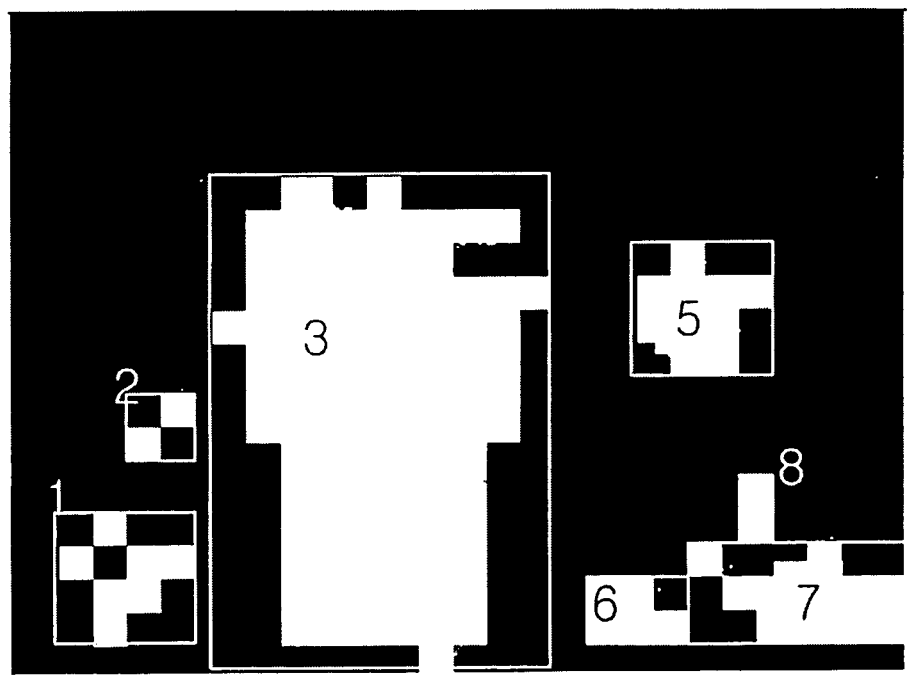

Such grouped grids are indicated as a single region. An example of the grouping of the grid image of FIG. 11 is shown in FIG. 14. As shown FIG. 14, it can be seen that the generated grids connected to each other are tied into 7 groups.

In FIG. 8, in next step, face region candidates are detected (S4). Namely, when face region candidates grid-grouped as shown in FIG. 14 are considered as a single region, candidates, only candidates to be determined as the face region by use of a ratio of width to length of the region and the like are leaved. An embodied example of determining the candidates is that if a ratio of the number of width pixel to length pixel in a face candidate region is within a prescribed range, the candidate region is determined as the face region.

In FIG. 8, in next step, the face region is confirmed (S5). It is confirmed whether the extracted face region candidates are the face regions by use of a face region template prepared in advance. The face region template, which means a characteristic of the face region imaged by combining a great number of face region images prepared in advance, is compared to actual candidate regions and then confirmed as the face region if a similarity between the face region template and the actual candidate regions is above a prescribed threshold value.

Figure 15:
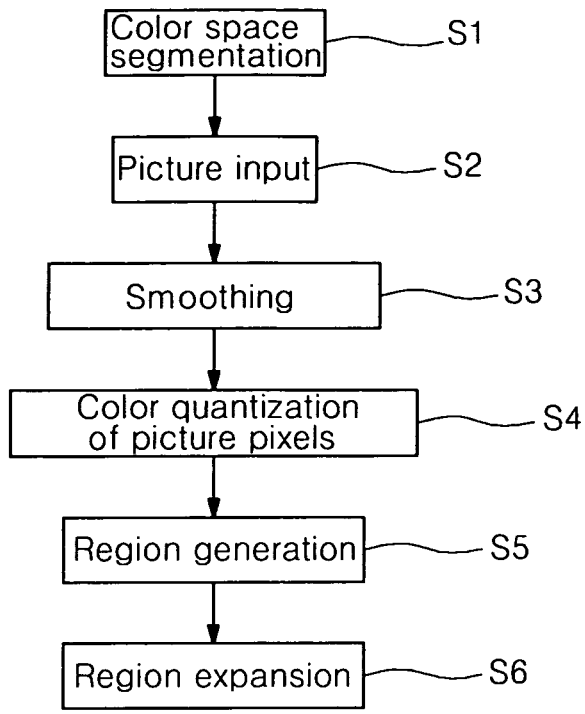
FIG. 15 is a view showing a homogeneous color/texture region segmentation procedure in a face region extraction process applied to a video telecommunication system according to the present invention.

FIG. 15 is a view for explaining a color-based general region segmentation method for segmenting the homogeneous color/texture regions in FIG. 7.

Referring to FIG. 15, first, a color space segmentation is performed (S1). Particularly, a YCrCb color space is segmented into N partial spaces by experiment. This is for mapping any pixel color to one of the N colors (color quantization). Subsequently, a picture is inputted (S2), and then a smoothing process for removing noises included in the inputted picture is performed so that values of adjacent m pixels are averaged (S3). Next, the smoothed picture is quantized into the N colors of the color space segmentation step (S4), and then, when pixels having same quantized color value are adjacent to each other, a region generation step for considering the pixels to be in a same region is performed (S5).

Figure 16:
FIG. 16 is a view showing an example of segmentation region image generated in the homogeneous color/texture region segmentation procedure of the FIG. 15.

Considering regions having a very small area of the regions generated in the region generation step S5 as noises, regions having similar color of other adjacent regions are merged in an expansible manner (S6). FIG. 16 shows an example of a segmentation region image generated so.

Figure 17:
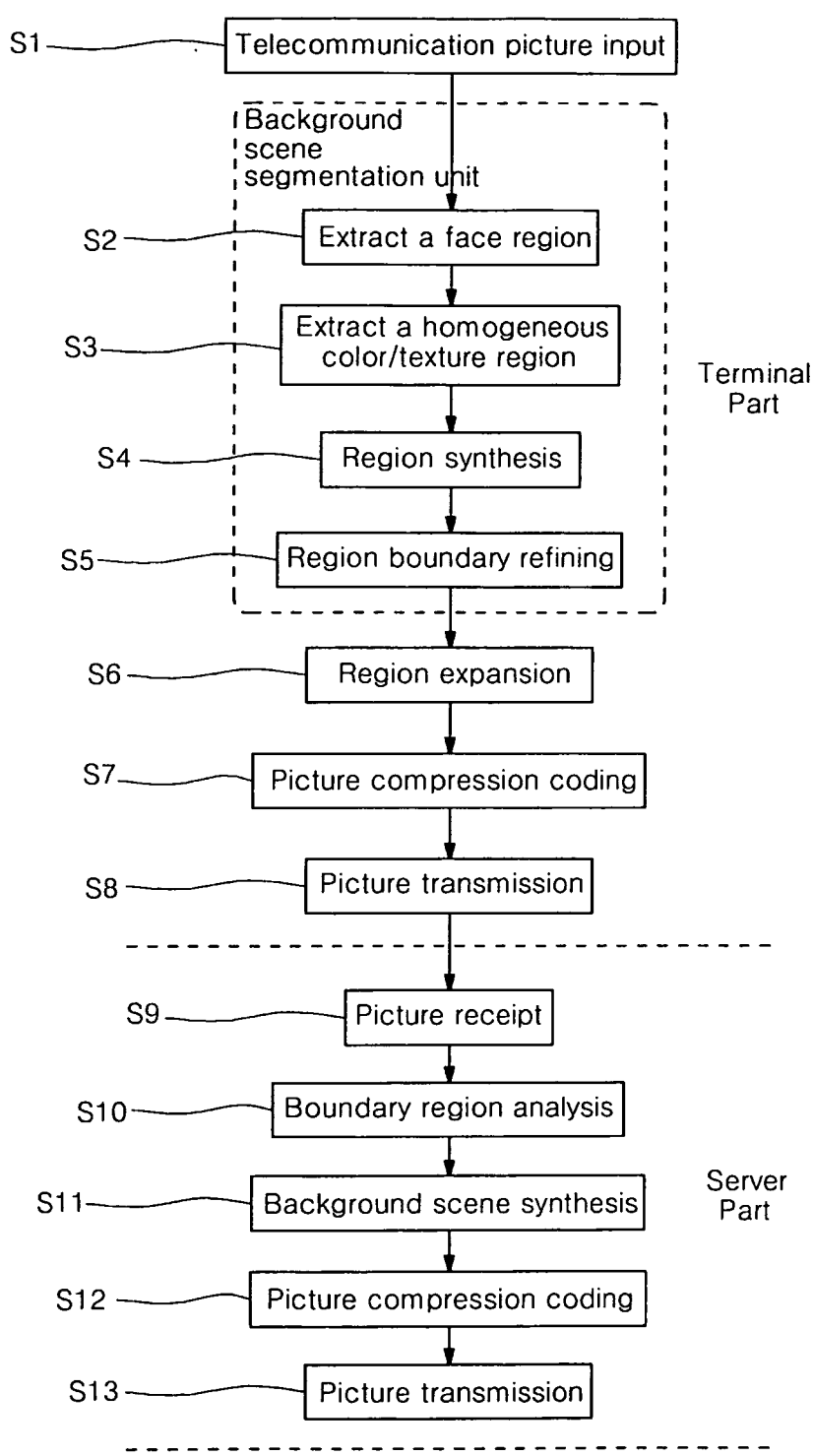
FIG. 17 is a flow chart for explaining a procedure of a video telecommunication according to the embodiment of FIG. 4.

FIG. 17 is a flow chart for explaining a procedure of a video telecommunication according to the embodiment of FIG. 4:

In the picture input procedure S1, when a video telecommunication begins, a picture to be transmitted is inputted as a system input. In the background scene segmentation procedure S2-S5, the background scene segmentation of the inputted picture is carried out according to the following steps.

First, in the face region extraction step S2, a position of region to be determined as a face by use of color information and the like is extracted. Next, in the homogeneous color/texture region segmentation step S3, regions having similar colors and textures are segmented. Next, in the region merge step S4, regions to be determined as human regions are merged (i.e., synthesized) by use of information on regions having homogeneous motions and the position of face region. Next, in the region boundary refine step S5, the boundary portions in the merged region are smoothed in order to prevent a deterioration of a picture quality due to a roughness of the boundary portions.

In the subsequent background scene boundary region description step S6, the information on the boundary between the human region and the background scene region, as described earlier. Next, in the picture compression procedure S7, compression coding (encoding) for transmitting the telecommunication picture, for example, the human picture and the information on the boundary of segmented regions, is performed. In the picture transmission procedure S8, the compressed picture signals are transmitted.

The procedures from the picture input S1 to the picture transmission S8 are performed in the terminal. The server performs remaining procedures, starting with procedure for receiving the data transmitted from the terminal.

In the picture reception step S9, the picture data of the human region and the region boundary information are received and decoded. In the boundary region analysis step S10, the received boundary region information is analyzed. In the background scene synthesis step S11, a new background scene is synthesized with the human picture by use of the analyzed segmentation region boundary information. The picture synthesized with the new background scene is coded in compression (S12) and the compressed picture having the new background scene is transmitted to a receipt side (S13).

Up to now, the background scene change video telecommunication system using the background scene separation and synthesis has been described. Hereinafter, as an example of application of the technology as described above, a transmission system for a video mail will be described.

The video mail transmission system is a system that a user photographs messages into a picture and transmits the picture by an electronic mail. The user can edit the message picture with a desired background scene in such a video mail. The background scene separation and automatic change technology of the present invention enables an edition of the video mail. Of course, since the video mail need not to change the background scene in real time unlike the video telecommunication environment, there is enough time to separate and synthesize the background scene after the picture is acquired.

Therefore, when the present invention is applied to the video mail transmission system, both of the background scene separation means and the background scene synthesis means can be provided in the terminal, or the background scene separation means can be provided in the terminal and the background scene synthesis means is provided in the server, or both of the background scene separation means and the background scene synthesis means can be provided in the server.

In addition, in the video mail, the user can edit the picture such that character string desired by the user is included in the picture. At that time, the user can set font or size of character, or can select a position at which the character is to be shown in the picture or a mode by which the character is displayed. The mode by which the character is displayed can be expected to include an effect for displaying the character at a fixed position or an effect for moving the character. Such a character string synthesis means can be located at either the terminal or the server.

Figure 18:
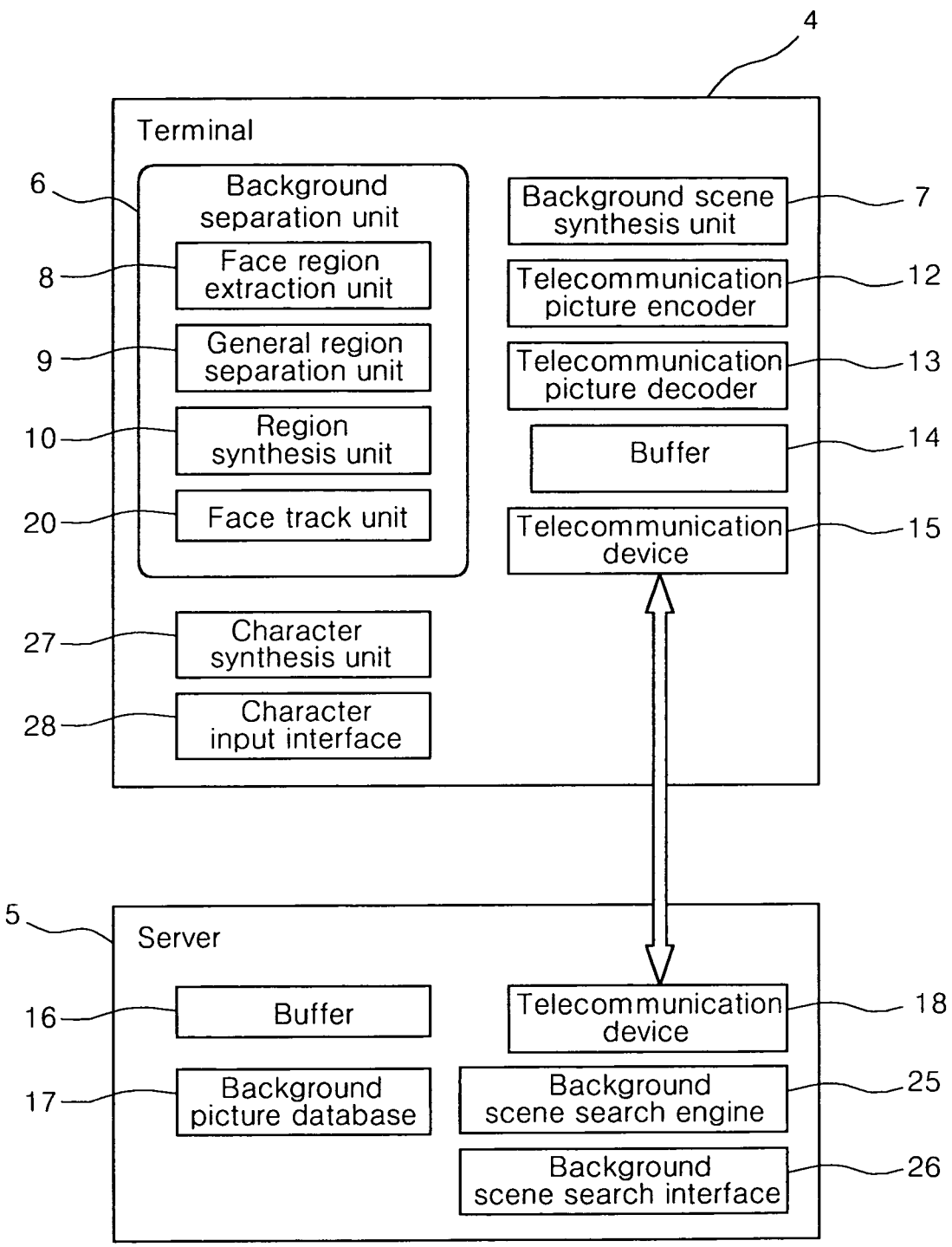
FIG. 18 is a view for showing a system configuration in which background scene separation and synthesis are achieved at a terminal for a video mail in a video telecommunication system according to the present invention.

FIG. 18 is a view for explaining a case that the terminal includes the background scene separation means, the background scene synthesis means, and character synthesis means and interface.

Referring to FIG. 18, the terminal 4 further includes a character synthesis unit 27 for preparing the video mail and a character input interface 28 for inputting characters. A user prepares and inputs messages to be transmitted by use of the character input interface 28, and selects a display position, display format, etc. of the messages. The character synthesis unit 27 synthesizes the characters inputted by the user. The synthesized characters together with a user picture having a new background scene synthesized by the background scene synthesis unit 7 are transformed into a format of video mail and then transmitted. Although FIG. 18 has elements that are not described, they have same reference numerals as elements in the video telecommunication system. Therefore, the descriptions of the separation and synthesis of the background scene and the object, the background scene search, and the transmission/receipt operation will be omitted for the sake of brevity.

Figure 19:
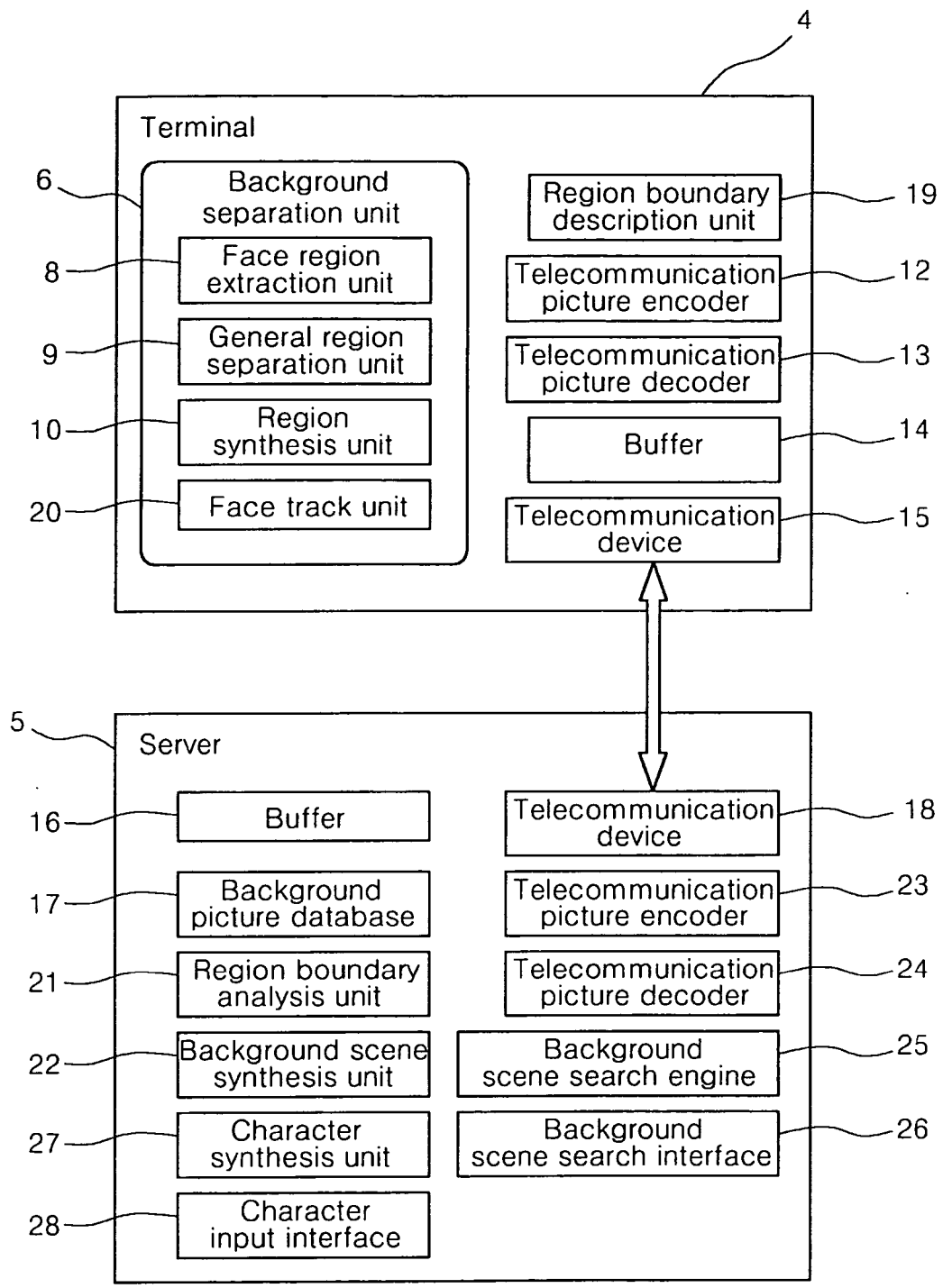
FIG. 19 is a view for showing a system configuration in which a background scene separation is achieved at a terminal and a background scene synthesis is achieved at a server for a video mail in a video telecommunication system according to the present invention.

FIG. 19 is a view for explaining a case that the terminal includes the background scene separation means and the region boundary description means and the server includes the background scene synthesis means, the region boundary analysis means, the character synthesis unit and the character input interface.

The construction of FIG. 19 is same as that of FIG. 18 except that the server 5 includes the character synthesis unit 27 for preparing the video mail and the character input interface 28 for inputting characters in FIG. 19.

Figure 20:
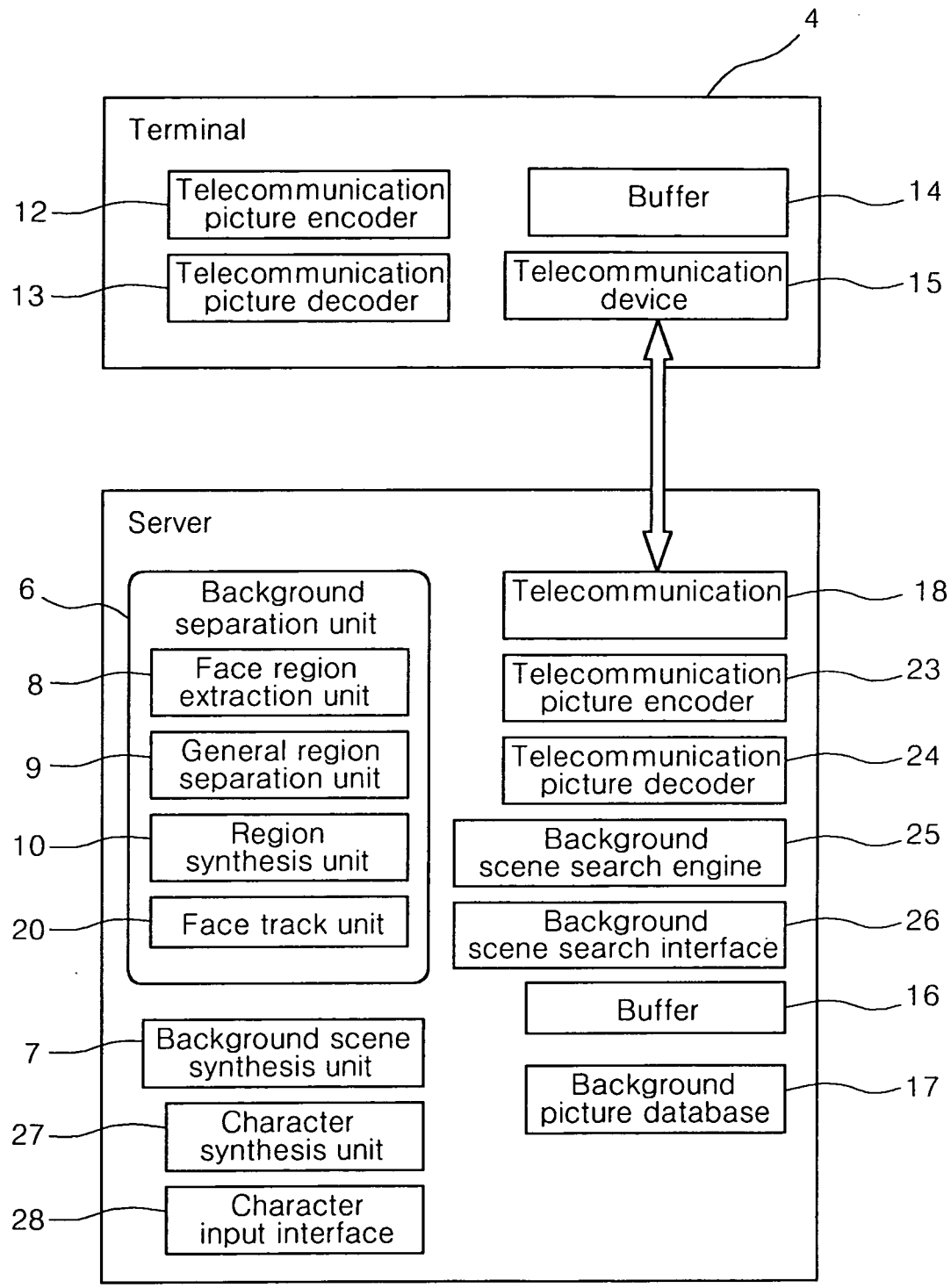
FIG. 20 is a view for showing a system configuration in which background scene separation and synthesis are achieved at a server for a video mail in a video telecommunication system according to the present invention.

FIG. 20 is a view for explaining a case that the server includes the background scene separation means, the background scene synthesis means, the character synthesis unit and the character input interface.

Referring to FIG. 20, the construction of FIG. 20 is same as those of FIGS. 18 and 19 except that the server 5 includes the background scene separation means, the background scene synthesis means, the character synthesis unit and the character input interface.

Figure 21:
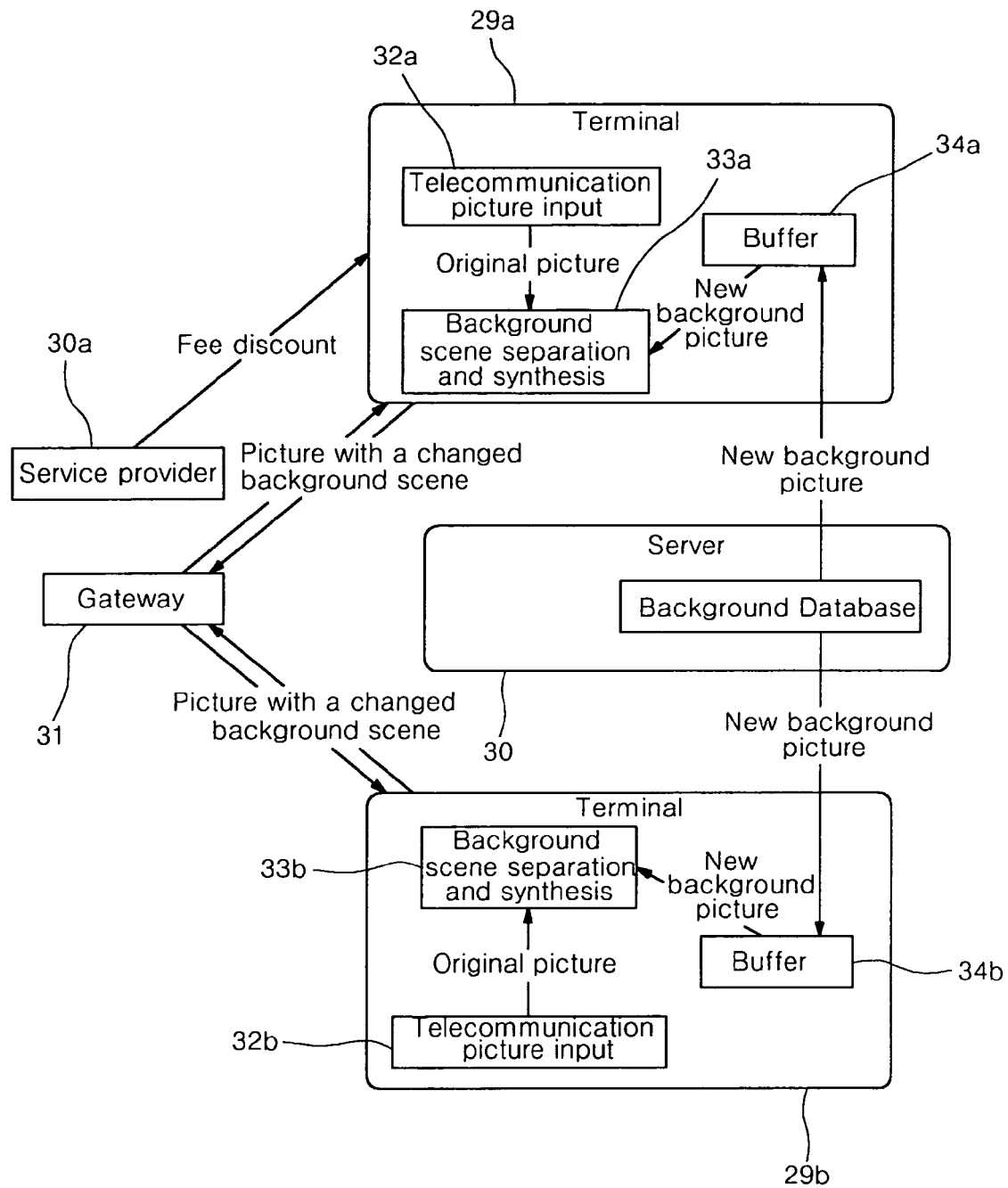
FIG. 21 is a view for showing a system configuration in which background scene separation and synthesis are achieved at a terminal and a server for providing background scenes provides a cost for a user, as an application of the present invention.

FIG. 21 is a view for explaining an example to which the video telecommunication system of the present invention is applicable.

Referring to FIG. 21, it is shown that a service provider designates optionally a background scene at the time of video telecommunication and a user has a benefit such as fee discount and so on. The video telecommunication includes the video mail system in a wide sense.

More particularly, when terminals 29a and 29b perform the video telecommunication via a server 30, a service provider 30a designates optionally a background scene and offers a benefit of fee discount to users as a cost for the background scene designation. Reference numeral 31 indicates a gateway. The terminals 29a and 29b include picture input units 32a and 32b, background scene separation and synthesis units 33a and 33b, buffers 34a and 34b, etc., respectively.

Figure 22:
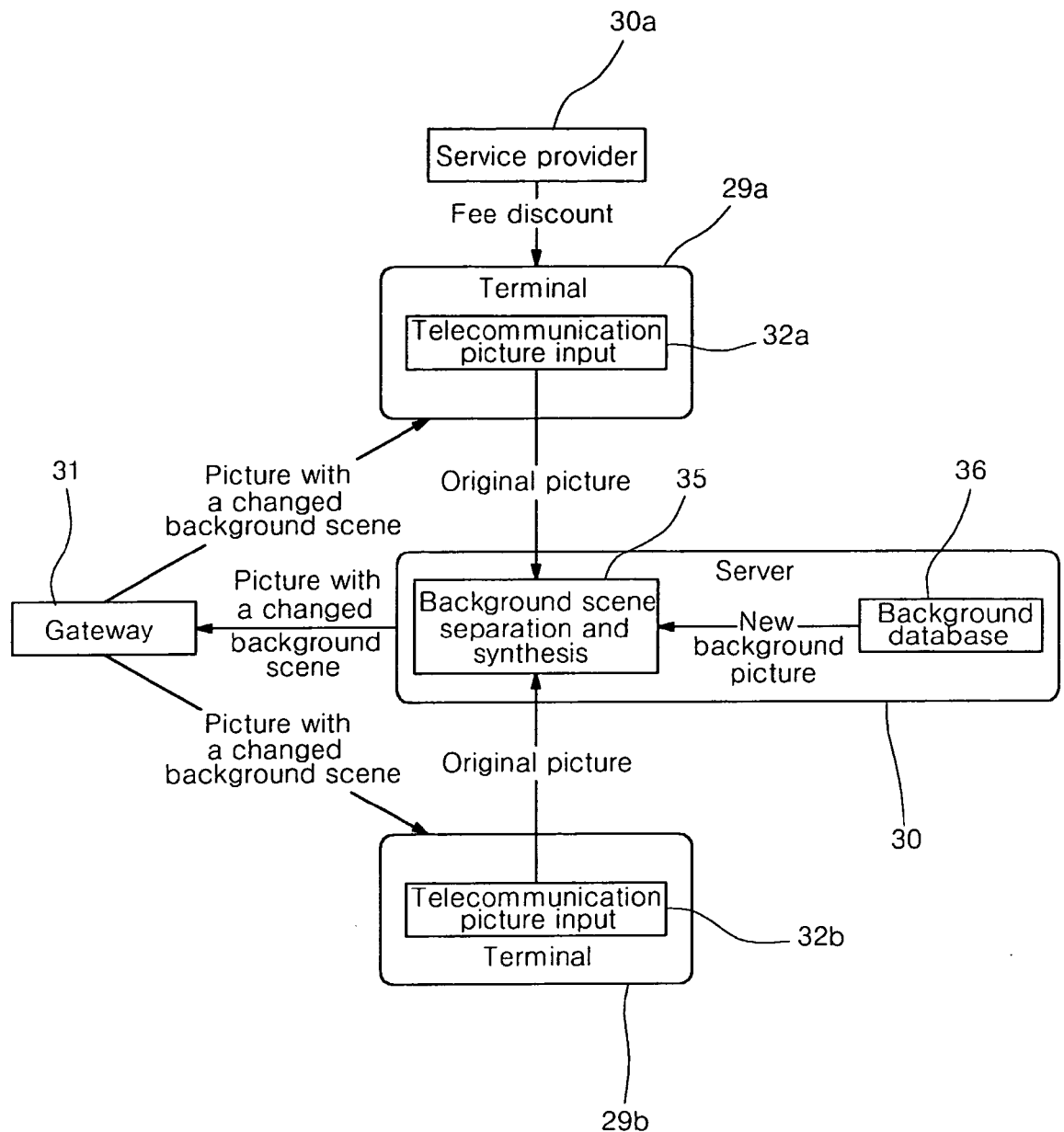
FIG. 22 is a view for showing a system configuration in which background scene separation and synthesis are achieved at a server and the server for providing background scenes provides a cost for a user, as another application of the present invention.

FIG. 22 is a view for explaining another example to which the video telecommunication system of the present invention is applicable.

Referring to FIG. 22, it is shown that a service provider designates optionally a background scene at the time of video telecommunication and a user has a benefit such as fee discount and so on. The video telecommunication includes the video mail system in a wide sense.

Unlike in FIG. 21, in FIG. 22, the terminals 29a and 29b include only elements, for example, the picture input units 32a and 32b, required for transmission/receipt process of the picture signals, respectively, and the server 30 includes the background scene separation and synthesis unit 35 and the background scene database 36. The operation related to the background scene change is same as in the video telecommunication system as described above. Therefore, the detailed description of this operation will be omitted for the sake of brevity.

In case of the video telecommunication systems of FIGS. 21 and 22, the background picture optionally selectable by the service provider may be an advertisement. When the advertisement is to be the background picture, a still picture or a moving picture giving an advertisement effect can be the background picture, or only partial region of an original background picture can be edited in a way that object pictures or characters giving an advertisement effect are inserted.

The present invention can perform a video telecommunication with a background scene desired by a user and automatically changed in real time. The video telecommunication can include both of video telephone and video mail transmission.

In addition, since the background scene automatically changed at the time of the video telephone or the video mail transmission can be selected as a background picture designated by the server, the user can save a telecommunication fee by taking a cost for a background designation by the service provider based on a promise between the service provider and the user.

According to the video telecommunication system and control method thereof of the present invention, the user can converse with other persons with a desired background scene set freely. Accordingly, privacies of individuals can be more reliably protected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A terminal for video telecommunication comprising:
   a background scene separation unit for separating a background scene region and a human region;
   a background scene synthesis unit for synthesizing the separated human region and a new background scene into a synthesized picture;
   a picture encoder for encoding the synthesized picture for telecommunication;
   a picture decoder for decoding picture signals received from other party; and
   a telecommunication device for transmitting an encoded picture with information on a boundary between the separated human region and a background scene, and receiving the picture signals according to communication protocol;

wherein the encoded picture is transmitted to a terminal of the other party through a buffer and the telecommunication device, wherein the background scene separation unit includes:
- a face region extraction unit for classifying cells of a picture into skin-colored cells and non-skin-colored cells based on how much skin color pixels occupy in each of the cells of the picture, for grouping connected skin-colored cells into face region candidates, and for determining a face region among the face region candidates based on whether a ratio of the number of width pixels to length pixels in the face region candidates is within a prescribed range;
- a general region separation unit for separating a general region outside the face region to generate a plurality of separated regions, and
- a region synthesis unit for determining regions corresponding to the human region from among the plurality of separated regions based on a position of the extracted face region, and for synthesizing the face region and regions determined as the human region to separate the background scene region and the human region.

2. The terminal for video telecommunication according to claim 1, wherein the general region separation unit identifies and separates regions having similar color and textures as single region by color and texture information.

3. The terminal for video telecommunication according to claim 1, wherein the background scene separation unit further includes:
- a region track unit for tracking a concerned region in next successive frames by use of information on the extracted face region.

4. The terminal for video telecommunication according to claim 1, wherein the new background scene is received from a server.

5. A terminal for video telecommunication comprising:
- a background scene separation unit to separate a background scene region and a human region;
- a background scene synthesis unit to synthesize the separated human region and a new background scene into a synthesized picture;
- a buffer;
- a telecommunication picture encoder to encode the synthesized picture;
- a telecommunication picture decoder to decode picture signals that are received via telecommunication from another party terminal; and
- a telecommunication device to transmit an encoded picture with information on a boundary between the separated human region and a background scene to the another terminal based on communication protocol, and the telecommunication device to receive the picture signals based on communication protocol, wherein the background scene separation unit includes:
- a face region extraction unit to classify cells of a picture into skin-colored cells and non-skin-colored cells based on how much skin color pixels occupy in each of the cells of the picture, to group connected skin-colored cells into face region candidates, and to determine a face region from among the face region candidates based on whether a ratio of the number of width pixels to length pixels in the face region candidates is within a prescribed range;
- a general region separation unit to separate a general region other than for the face region to generate a plurality of separated regions, and
- a region synthesis unit to determine regions corresponding to the human region from among the plurality of separated regions based on a position of the extracted face region, and to synthesize regions determined as the human region to separate the background scene region and the human region.

6. The terminal for video telecommunication according to claim 5, wherein the general region separation unit identifies and separates regions having similar color and textures as a single region by color and texture information.

7. The terminal for video telecommunication according to claim 5, wherein the background scene separation unit further includes:
- a region track unit to track a concerned region in next successive frames by use of information on the extracted face region.

8. The terminal for video telecommunication according to claim 5, wherein the new background scene is received from a server.

* * * * *